United States Patent [19]
Scruggs et al.

[11] Patent Number: 5,936,376
[45] Date of Patent: Aug. 10, 1999

[54] EXCITATION CIRCUIT FOR BALANCING PHASE VOLTAGES IN A TWO PHASE MOTOR

[75] Inventors: Michael K. Scruggs, Pompton Plains; Serdar T. Sozusen, Pinebrook; Randy C. Abramovitz, Garfield, all of N.J.

[73] Assignee: AlliedSignal Inc.

[21] Appl. No.: 09/062,355

[22] Filed: Apr. 17, 1998

[51] Int. Cl.$^6$ ....................................................... H02P 1/40
[52] U.S. Cl. ........................... 318/747; 318/809; 318/806; 318/808; 318/599; 318/723; 318/798; 318/747
[58] Field of Search ................................... 318/809, 806, 318/808, 599, 723, 798, 747

[56] References Cited

U.S. PATENT DOCUMENTS

| | | | |
|---|---|---|---|
| 3,648,112 | 3/1972 | Beckwith | 318/809 |
| 4,384,247 | 5/1983 | Stewart | 318/808 |
| 4,453,122 | 6/1984 | Johnson et al. | 318/806 |

*Primary Examiner*—Karen Masih
*Attorney, Agent, or Firm*—Loria B. Yeadon

[57] ABSTRACT

An excitation circuit is disclosed for balancing the phase voltages in a two phase motor. The excitation circuit includes a first and second switch and a port for receiving a signal to drive the switches. The excitation circuit also includes additional electrical circuitry which can be designed to adjust the speed and timing of the first and second switches and balance the phase voltages in the two phase motor.

14 Claims, 10 Drawing Sheets

EXCITATION CIRCUIT FOR BALANCING PHASE VOLTAGES IN A TWO PHASE MOTOR

BACKGROUND

A) Field of Invention

The present invention relates to a two phase motor, and more particularly to an excitation circuit for balancing the phase voltages in a two phase motor.

B) Description of Related Art

Figure 1:
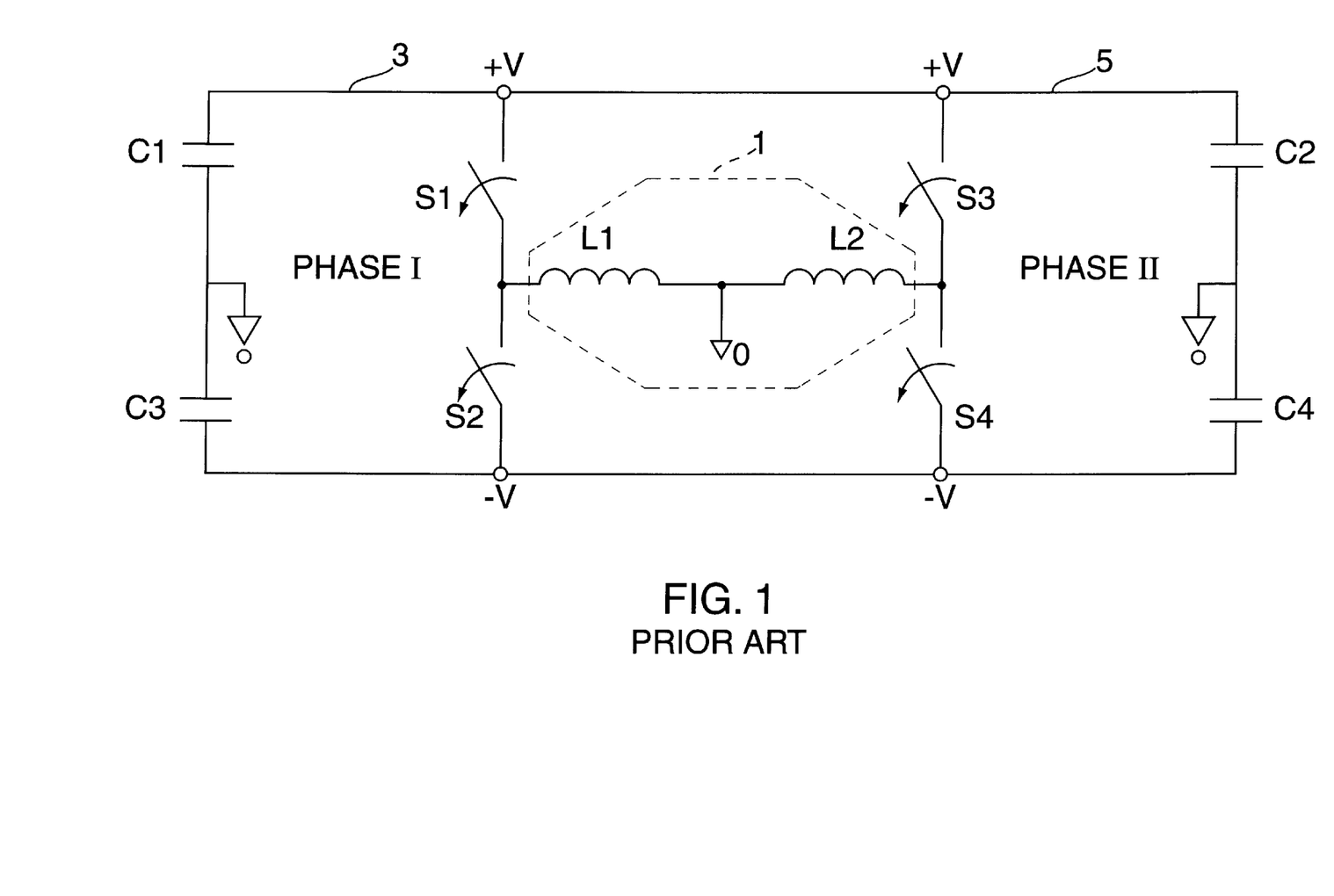
FIG. 1 illustrates a conventional two phase motor and corresponding excitation circuits.

FIG. 1 shows a conventional two phase motor 1 and corresponding excitation circuits 3 and 5. The motor 1 contains two motor windings L1 and L2. A voltage +V and −V is supplied to each excitation circuit 3 and 5 by an external battery or power supply as is known in the art.

The excitation circuit 3 contains two capacitors C1 and C3 to create a positive and negative filtered voltage, as well as two switches S1 and S2. Similarly, the excitation circuit 5 contains two capacitors C2 and C4 to create a positive and negative filtered voltage, and two switches S3 and S4.

As is known in the art, the switches S1–S4 are typically either transistors or power MOSFET's. The switches S1–S4 can also be IGBT's.

In the conventional device shown in FIG. 1, the switches S1–S4 are controlled to create a Phase I voltage and a Phase II voltage. In particular, during operation, a Phase I voltage is generated by controlling switches S1 and S2 to alternatively connect the winding L1 to the positive and negative voltage supplies +V and −V. Correspondingly, a Phase II voltage is generated by controlling switches S3 and S4 to alternatively connect the winding L2 to the positive and negative voltage supplies +V and −V.

Figure 2:
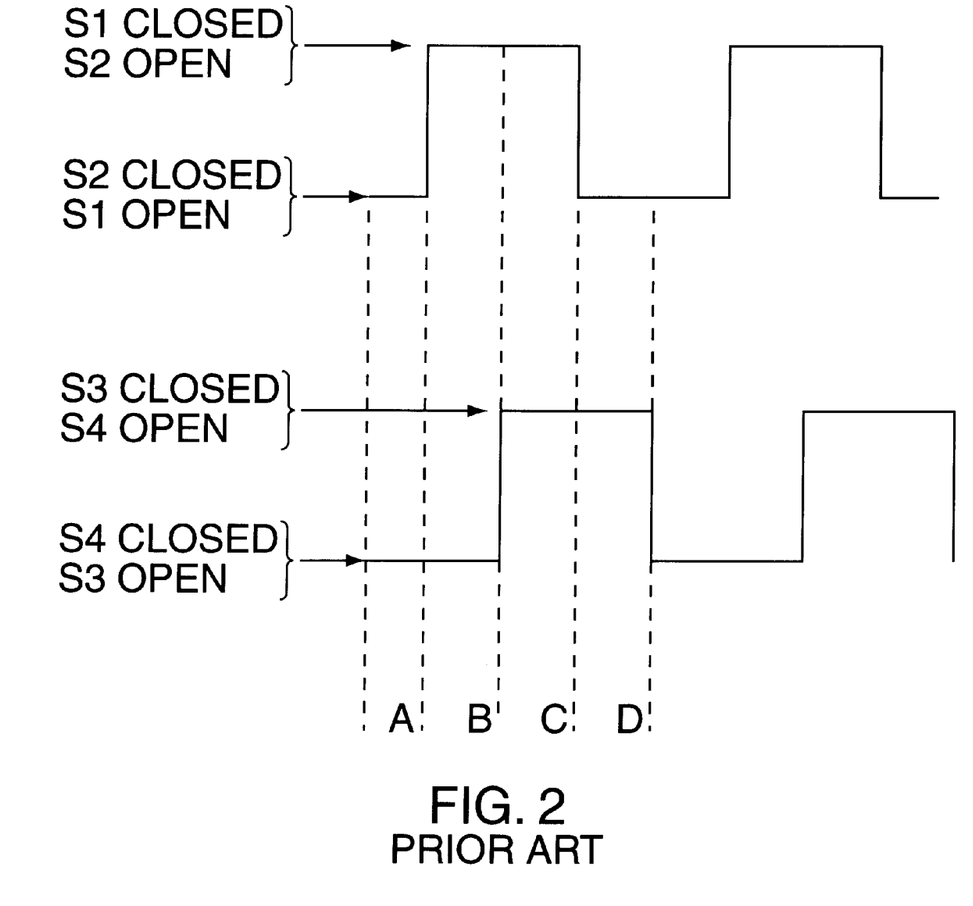
FIG. 2 illustrates the waveforms of drive signals that are used to control the positioning of switches S1–S4 shown in FIG. 1, along with the positioning of switches S1–S4, during time periods A–D.

The switches S1–S4 are controlled in a manner to create a Phase II voltage which has a 90° phase shift from the Phase I voltage. FIG. 2 displays waveforms of drive signals used to control the positioning of switches S1–S4. As is known in the art, the drive signals can be produced by a microprocessor or integrated circuit.

FIG. 2 also shows the corresponding positioning of the switches S1–S4 at time periods A–D. Table 1 below summarizes the positioning of switches S1–S4 during time periods A–D.

TABLE 1

|   | S1 | S2 | S3 | S4 |
|---|---|---|---|---|
| A | Open | Closed | Open | Closed |
| B | Closed | Open | Open | Closed |
| C | Closed | Open | Closed | Open |
| D | Open | Closed | Closed | Open |

In the conventional device shown in FIG. 1, the inductive effects of motor windings L1 and L2 cause undesirable imbalances in the Phase I voltage. These imbalances become apparent by reviewing the operation of the excitation circuits 3 and 5 during time periods A–D. This review is presented below.

Figure 3:
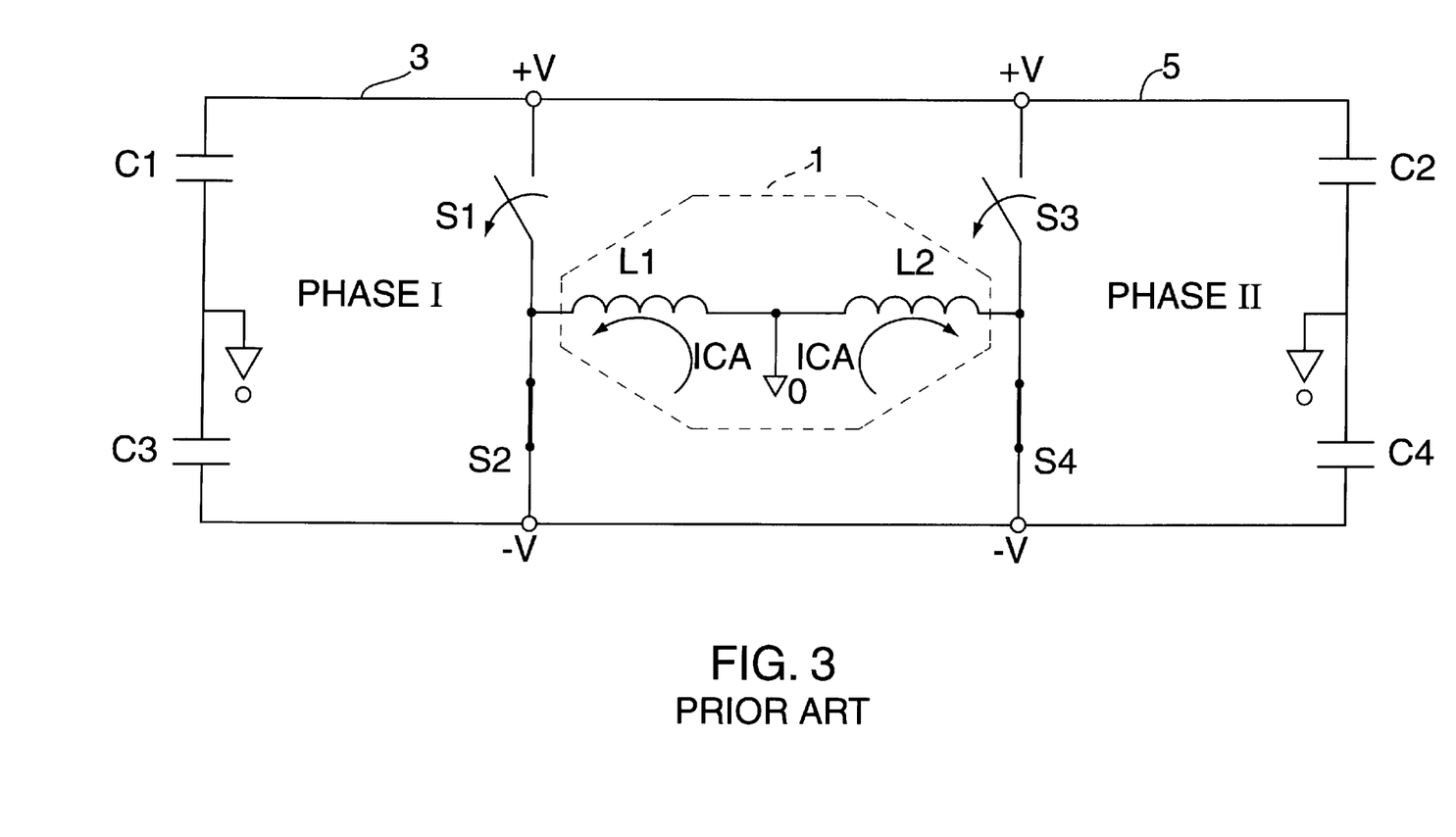
FIG. 3 illustrates the conventional motor and excitation circuits of FIG. 1 during time period A when switches S1 and S3 are open and switches S2 and S4 are closed.

FIG. 3 shows a conventional device during time period A when switches S1 and S3 are open and switches S2 and S4 are closed. During time period A, the motor phase windings L1 and L2 are respectively connected to the negative voltage supply −V. This results in inductor currents ICA being built-up in windings L1 and L2.

Figure 4:
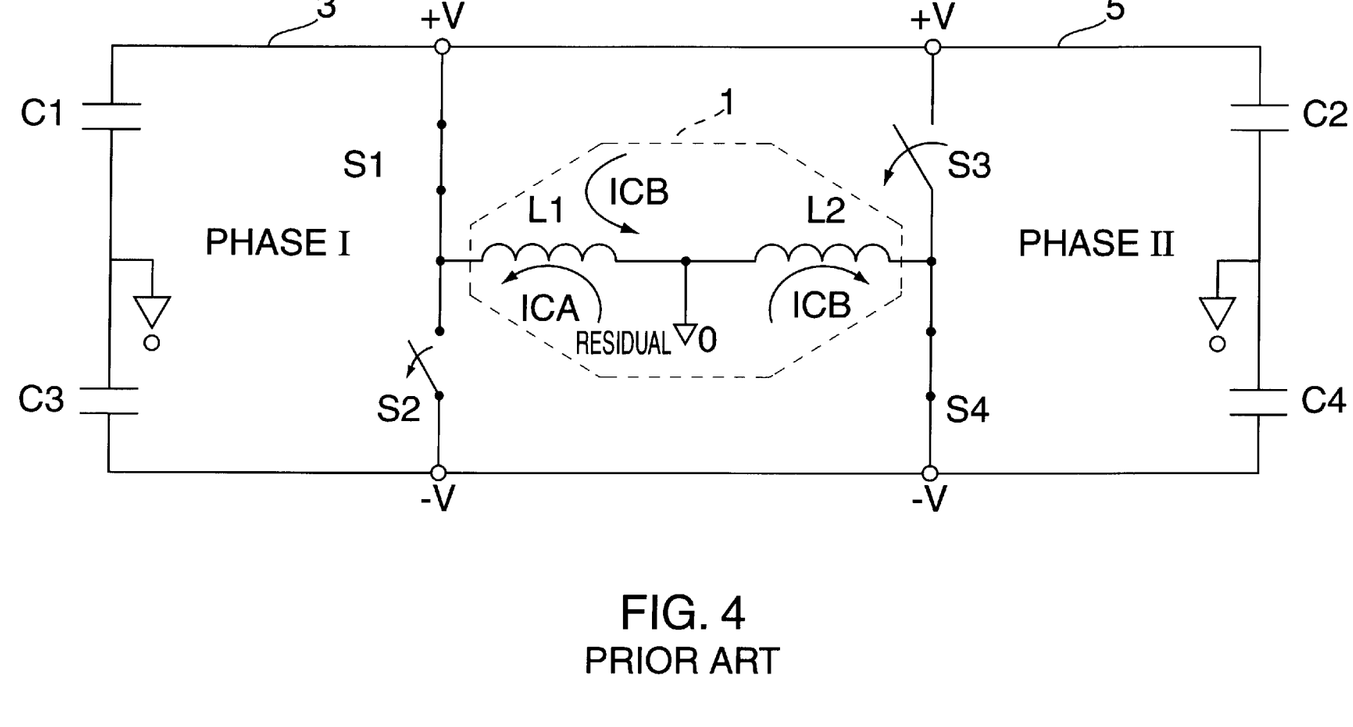
FIG. 4 illustrates the conventional motor and excitation circuits of FIG. 1 during time period B when switches S2 and S3 are open and switches S1 and S4 are closed.

Referring to FIG. 4, during the transition from time period A to time period B, switch S2 opens and switch S1 closes. As a result, motor winding L1 is disconnected from the negative voltage −V and connected to the positive voltage supply +V. When this occurs, inductor currents ICB begin to build-up in windings L1 and L2.

During this transition, the inductor current in winding L1 is required to change directions. However, it is not physically possible for the current to instantaneously change directions given the presence of a residual current from ICA. As a result, the residual current from ICA raises the voltage on C1 and causes a voltage imbalance (i.e., overshoot) to appear on the Phase I voltage. This voltage imbalance is identified on FIG. 5 as reference numeral 7.

Figure 6:
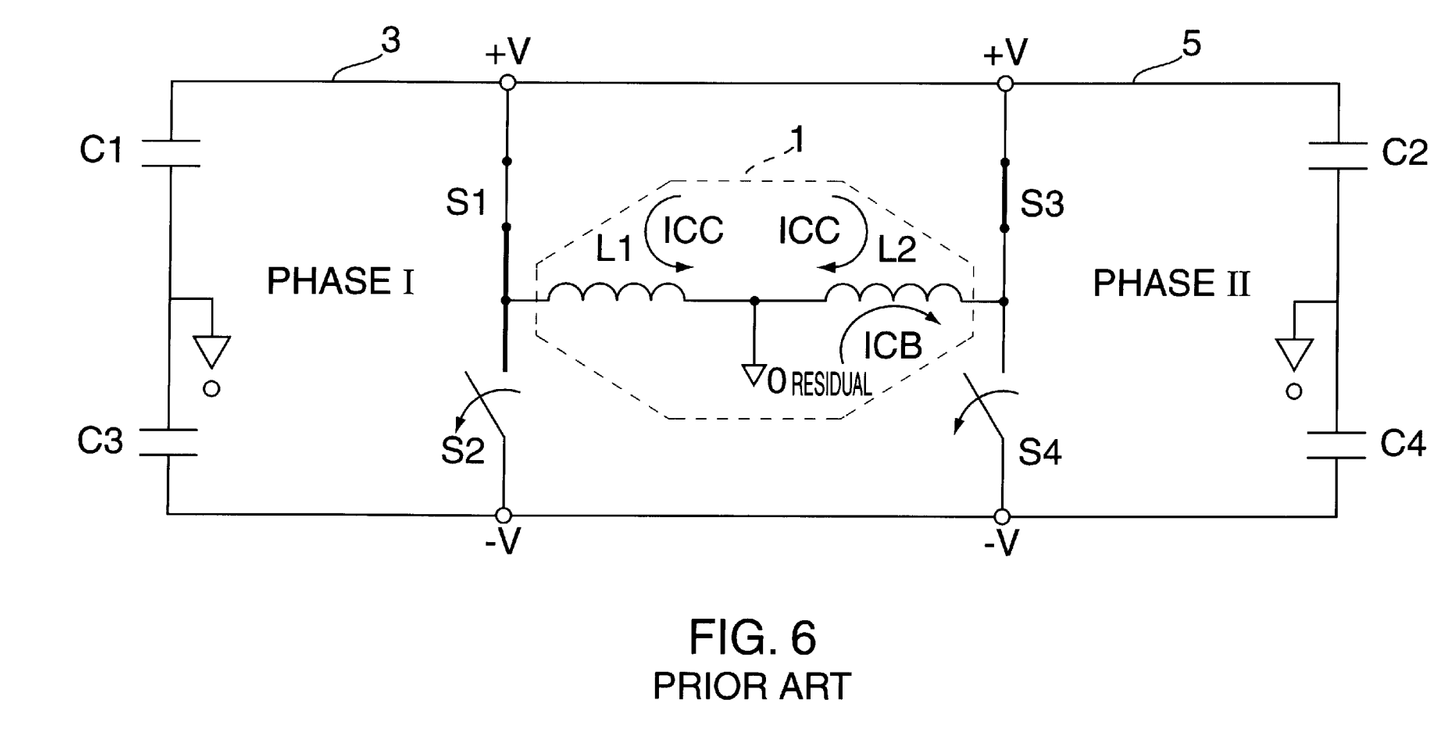
FIG. 6 illustrates the conventional motor and excitation circuits of FIG. 1 during time period C when switches S2 and S4 are open and switches S1 and S3 are closed.

During the transition from time period B to time period C, as shown in FIG. 6, the switch S3 closes and switch S4 opens. This results in the winding L2 being disconnected from the negative voltage supply −V and being connected to the positive voltage supply +V. When this occurs, inductor currents ICC begin to build up in windings L1 and L2. However, this does not 20 generate a voltage imbalance on the Phase II voltage since the current residual from ICB flows from winding L2 through switch S3 and S1 and into winding L1.

Figure 7:
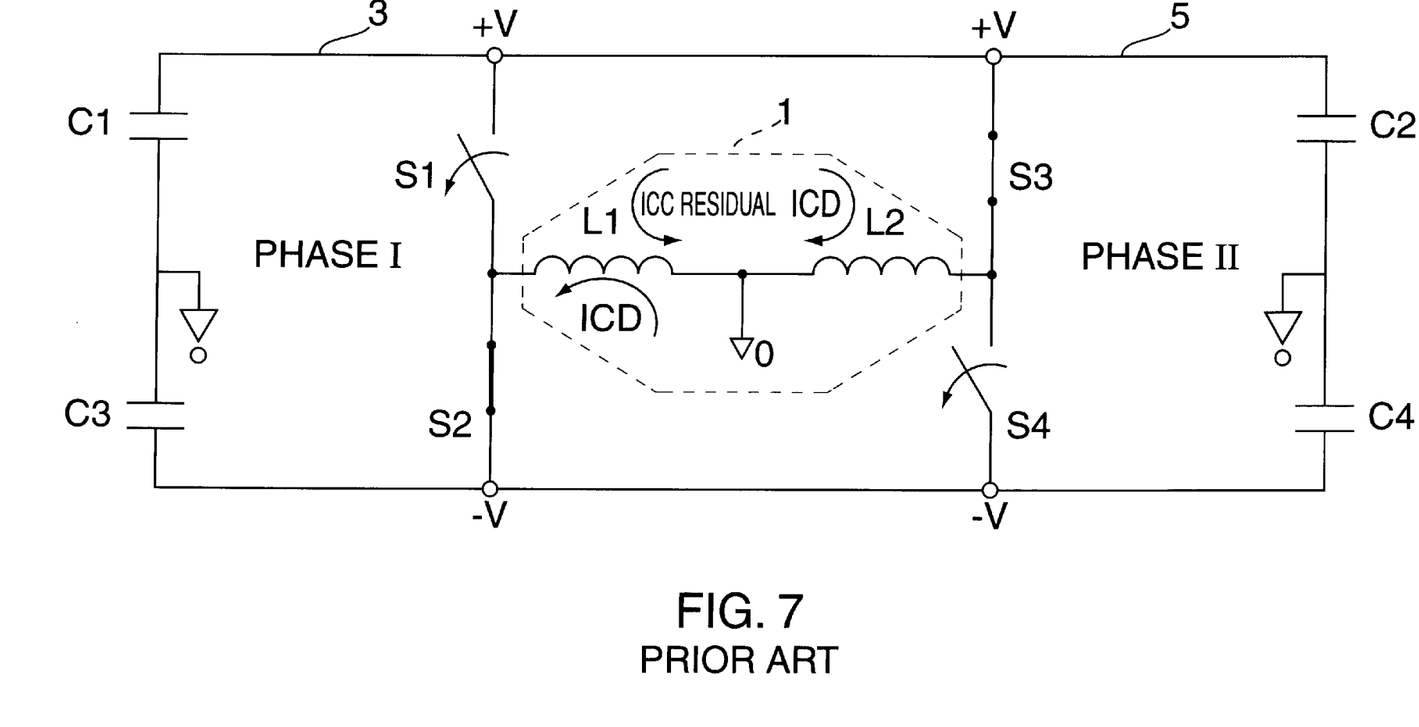
FIG. 7 illustrates the conventional motor and excitation circuits of FIG. 1 during time period D when switches S1 and S4 are open and switches S2 and S3 are closed.

Referring to FIG. 7, during the transition from time period C to time period D, the switch S1 opens and the switch S2 closes. As a result, motor winding L1 is disconnected from the positive voltage supply +V and connected to the negative voltage −V. When this occurs, inductor currents ICD begin to build-up in windings L1 and L2.

Figure 5:
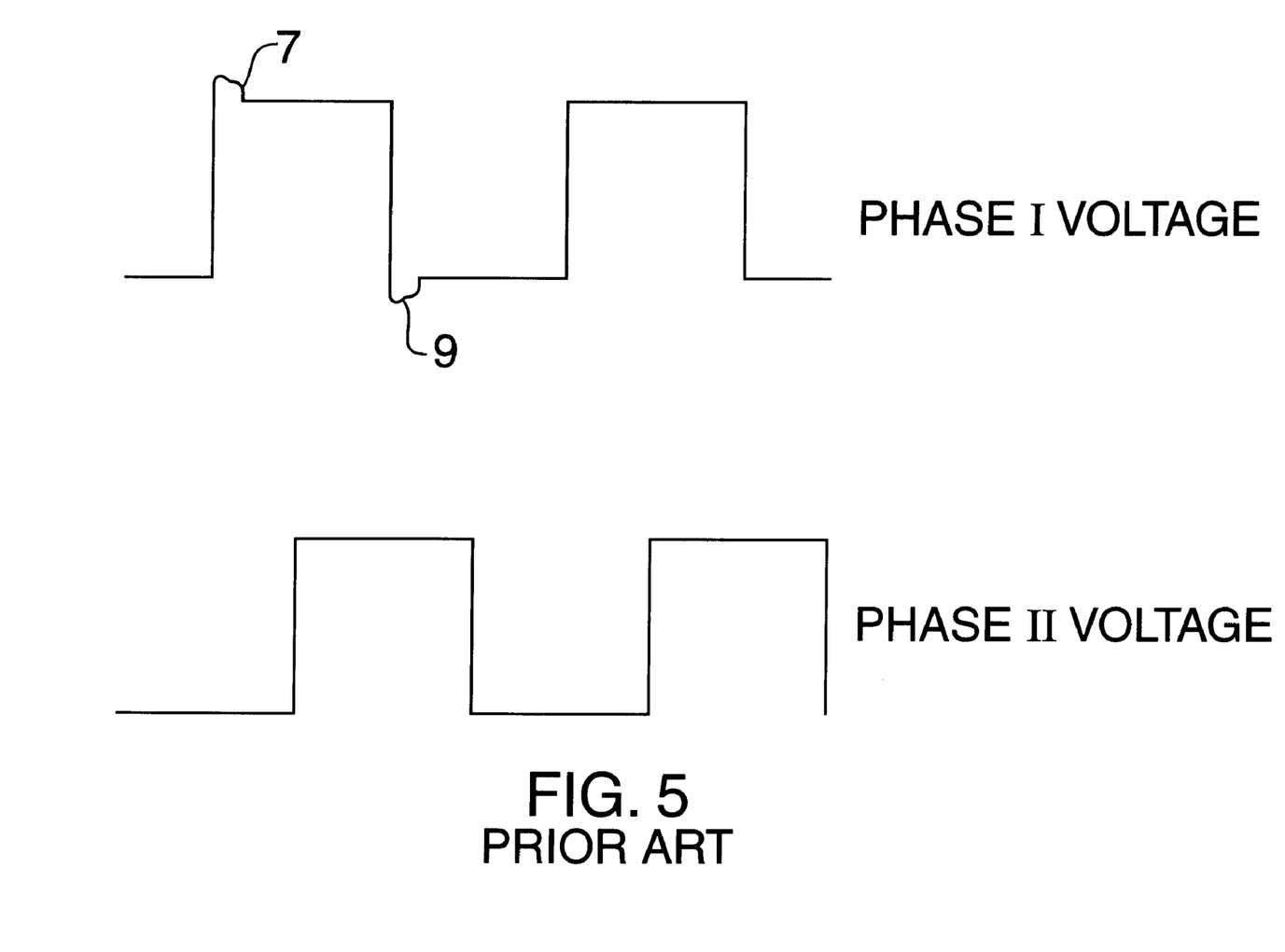
FIG. 5 illustrates actual waveform outputs of the Phase I and Phase II voltages for the conventional motor and excitation circuits shown in FIG. 1.

During this transition, current in the winding L1 is again required to change directions. However, here again, it is not physically possible for the current to instantaneously change direction given the presence of a residual current from ICC. As a result, the residual current from ICC flows through switch S2, raises the voltage on C3, and causes a voltage imbalance (i.e., overshoot) to appear on the Phase I voltage. This voltage imbalance is shown in FIG. 5 as reference numeral 9.

The conventional devices shown in FIGS. 1–7 and described above obviously have certain drawbacks. Most notably is that the fact that energy stored in motor winding L1 gets transferred to capacitors C1 and C3 during a transition from time periods A to B and from time periods C to D. As a result, an unwanted imbalance appears on the Phase I motor voltage.

As is known in the art, the energy stored in motor winding L1, which gets transferred to supply capacitors C1 and C3 and causes the voltage imbalance, can be absorbed by increasing the size of the capacitors C1 and C3 by roughly a factor of 10. However, this known solution has a significant drawback In particular, this known solution significantly increases the size of the electronics package.

It has also been known to absorb the energy stored in the motor winding L1 by placing a zener diode or transistor clamp on the power supply rail voltages. This known solution also has drawbacks. That is, when this solution is implemented, the zener diodes or transistor clamps are required to dissipate large amounts of power. This dissipation of power creates unwanted heat which in turn significantly diminishes the life cycle of the circuit.

In view of these problems, there currently exists a need for an excitation circuit which can balance the phase voltages in a two phase motor without increasing the size of the electronics package or without requiring a large amount of power to be dissipated.

OBJECTS AND SUMMARY OF THE INVENTION

It is accordingly an object of the present invention to provide an excitation circuit which can balance the phase voltages in a two phase motor without increasing the size of the electronics package.

It is another object of the invention to provide an excitation circuit which can balance the phase voltage in a two phase motor without requiring that a large amount of power be dissipated.

In accordance with one embodiment of the invention, an excitation circuit for balancing the phase voltages in a two phase motor is disclosed where the circuit comprises: a first and second switch; means for generating a signal to drive the first and second switches; and, means for adjusting the speed and timing of the first and second switches to balance the phase voltages.

In accordance with another aspect of this embodiment of the invention, the first switch is a P channel MOSFET and the second switch is an N channel MOSFET.

In accordance with yet another aspect of this embodiment of the invention, the adjusting means includes: a first transistor for controlling a first voltage which drives the first switch; a second transistor for controlling a second voltage which drives the second switch; a first and second resistor for scaling the first voltage and controlling a speed of the first switch; and a third and fourth resistor for scaling the second voltage and controlling a speed of the second switch.

In accordance with still another aspect of this embodiment of the invention, the excitation circuit further comprises: a capacitor which controls the time during which the first and second transistors remain on and off; and, a fifth and sixth resistor for controlling the speed of the first and second transistors.

In accordance with another embodiment of the invention, a method for balancing the phase voltages in a two phase motor is described where the method comprises the steps of: (i) receiving a drive signal for operating a first and second switch; (ii) removing a DC component from the drive signal to create a positive voltage portion and a negative voltage portion; (iii) applying the positive voltage portion of the drive signal to a first transistor to produce a first voltage for driving the first switch; (iv) applying the negative voltage portion of the drive signal to a second transistor to produce a second voltage for driving the second switch; and, (v) adjusting the speed of the first and second switches and the first and second transistors to balance the phase voltage.

In accordance with yet another embodiment of the invention a two phase motor is described which comprises: a first motor winding; a first excitation circuit which is connected to the first motor winding for creating a first phase voltage, where the first excitation circuit contains a first and second switch; a second motor winding; a second excitation circuit which is connected to the second motor winding for creating a second phase voltage, where the second excitation circuit contains a third and fourth switch; means for producing a first drive signal to control the positioning of the first and second switch; and, means for producing a second drive signal to control the positioning of the third and fourth switch, where the second drive signal has a relative phase, as compared to the first drive signal, which is adjusted to eliminate an imbalance in at least one of the first and second phase voltages.

In accordance with another aspect of this embodiment of the invention, the first excitation circuit includes: a port for receiving the first drive signal; and means for adjusting the speed and timing of the first and second switches to balance the phase voltages.

In accordance with still another aspect of this embodiment of the invention, the first switch is a P channel MOSFET and the second switch is an N channel MOSFET.

In accordance with yet another aspect of this embodiment of the invention, the adjusting means includes: a first transistor for controlling a first voltage which drives the first switch; a second transistor for controlling a second voltage which drives the second switch; a first and second resistor for scaling the first drive voltage and controlling a speed of the first switch; and a third and fourth resistor for scaling the second drive voltage and controlling a speed of the second switch.

In accordance with still another aspect of this embodiment of the invention, the excitation circuit further comprises: a capacitor which controls the time during which the first and second transistors remain on and off; and, a fifth and sixth resistor for controlling the speed of the first and second transistors.

In accordance with another embodiment of the invention, an excitation circuit for balancing the phase voltages in a two phase motor having a first and second winding is disclosed where the circuit comprises: a first and second switch which are respectively connected to the first and second winding; means for generating a signal to drive the first and second switches; and, means for adjusting the speed and timing of the first and second switches to balance the phase voltages.

In accordance with another aspect of this embodiment of the invention, the first switch is a P channel MOSFET and the second switch is an N channel MOSFET.

In accordance with yet another aspect of this embodiment of the invention, the adjusting means includes: a first transistor for controlling a first voltage which drives the first switch; a second transistor for controlling a second voltage which drives the second switch; a first and second resistor for scaling the first voltage and controlling a speed of the first switch; and a third and fourth resistor for scaling the second voltage and controlling a speed of the second switch.

In accordance with still another aspect of this embodiment of the invention, the excitation circuit further comprises: a capacitor which controls the time during which the first and second transistors remain on and off; and, a fifth and sixth resistor for controlling the speed of the first and second transistors.

BRIEF DESCRIPTION OF THE DRAWINGS

The accompanying drawings are included to provide an understanding of the invention and constitute a part of the specification.

DETAILED DESCRIPTION OF THE INVENTION

Figure 8:
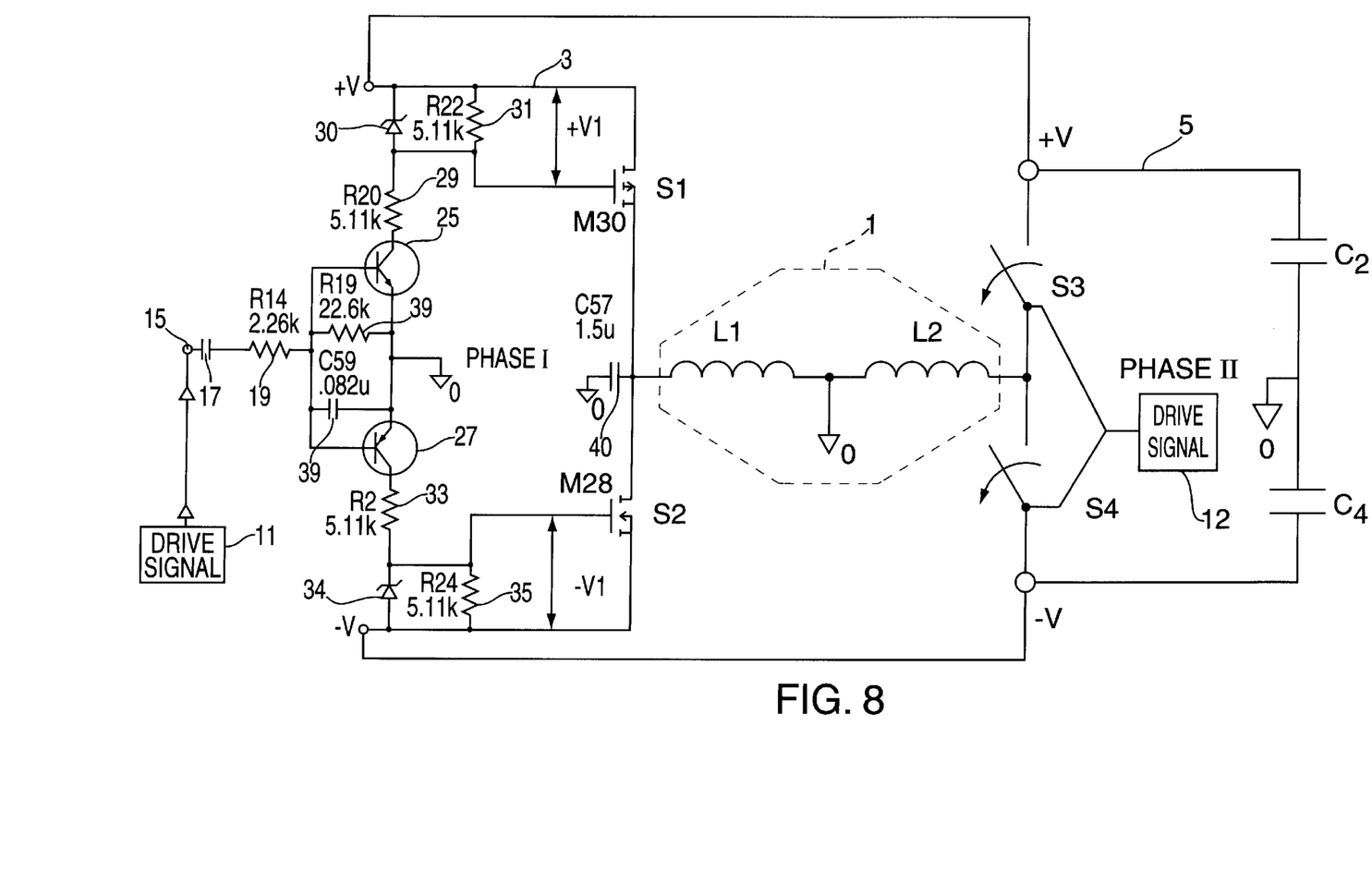
FIG. 8 illustrates a two phase motor and corresponding excitation circuits 3 and 5 developed in accordance with the present invention.

FIG. 8 shows a two phase motor 1 and corresponding excitation circuits 3 and 5 developed in accordance with the present invention. The excitation circuit 3 and operation of switches S1 and S2, according to the present invention, is significantly different as compared to the conventional excitation circuit 3 described above. In particular, the excitation circuit 3 developed in accordance with present invention eliminates the Phase I voltage imbalance present in conventional devices by adjusting both the speed and timing of the switches S1 and S2 and by incorporating a capacitor to absorb the residual current in winding L1. A detailed description of the operation of the excitation circuit 3 is provided below.

Referring to FIG. 8, a drive signal 11 is provided to control the operation of switches S1 and S2. The drive signal 11 is produced by a signal generator and enters the excitation circuit 3 at port 15. It is also noted that a drive signal 12 is provided to control the operation of switches S3 and S4. Similarly, the drive signal 12 enters the excitation circuit 5 at ports connected to switches S3 and S5.

Figure 9A:
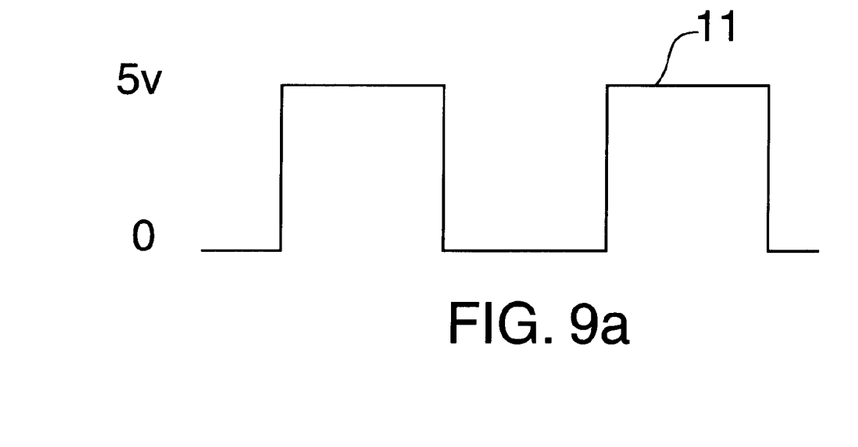
FIGS. 9(a) and 9(b) illustrate a drive signal that is used to control an excitation circuit developed in accordance with the present invention; and, FIG. 10 illustrates a relationship between a drive signal used to drive switches S1 and S2, and a drive signal used to drive switches S3 and S4 of the device shown in FIG. 8.

FIG. 9(a) is graphical representation of the drive signal 11. The drive signal 11 is a typical square wave signal.

After the drive signal 11 enters the excitation circuit 3, the signal passes through a capacitor 17 and a resistor 19. The capacitor 17 and resistor 19 are provided in the excitation circuit 3 for two reasons.

First, these two components are provided for safety reasons. That is, if for some reason the drive signal 11 either ceases to exist or stays in one state for too long of a time period, these two components cause the switches S1 and S2 to remain in an open state.

Figure 9B:
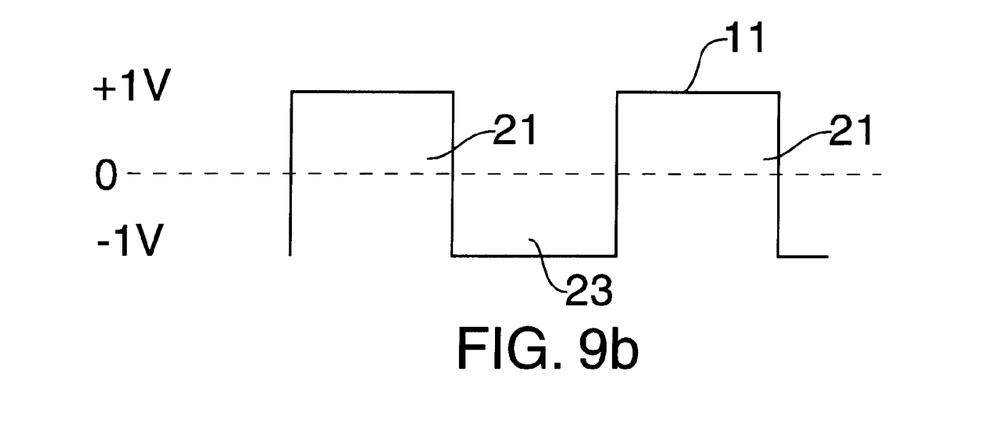

Second, the capacitor 17 and resistor 19 also level shift the drive signal 11 to remove the DC component and produce the signal shown in FIG. 9(b). This level shifting creates a square wave drive signal 11 with a voltage that ranges between the base and emitter voltage of transistors 25 and 27. This voltage typically falls within a range of +1V and −1V. Moreover, the resulting drive signal 11 has a positive voltage portion 21 and a negative voltage portion 23.

Referring again to FIG. 8, the excitation circuit 3 also includes transistors 25 and 27. The transistor 25 responds to portion 21 of the drive signal 11 which has a positive voltage, whereas, the transistor 27 responds to portion 23 of the drive signal 11 which has a negative voltage.

The result of this design is that the output of the transistor 25 swings between 0 and +V to generate to the drive voltage for switch S1. Similarly, the output of transistor 27 swings between 0 and −V to generate the drive voltage for switch S2.

The switch S1 used in the excitation circuit 3 shown in FIG. 8 is a P channel MOSFET. Resistors 29 and 31 are also included in the excitation circuit 3 to control the operation of the switch S1. In particular, these two resistors are provided to scale the drive voltage for the P channel MOSFET from +V to +V1, and to control the speed of the P channel MOSFET switch S1.

The relationship between the scale voltage +V1 and the resistors 29 and 31 is determined by the Equation 1 below:

$$+V1 = [R29/(R29+R31)][+V] \qquad 1:$$

The relationship between the speed of the P channel MOSFET switch S1 and the resistors 29 and 31 is determined by Equation 2 below:

$$\text{Speed of } S1 = \frac{1}{[(R29 * R31)/(R29+R31)][\text{Capacitance of the } P \text{ Channel MOSFET}]} \qquad 2:$$

Thus, as can be seen from Equations 1 and 2, by adjusting the resistance of resistors 29 and 31, the drive voltage +V1 and speed of the P Channel MOSFET switch S1 can be controlled.

The switch S2 used in the excitation circuit 3 shown in FIG. 8 is a N channel MOSFET. Resistors 33 and 35 are also included in the excitation circuit 3 to control the operation of switch S2. In particular, these two resistors are provided to scale the drive voltage for the N channel MOSFET switch S2 from −V to −V1, and to control the speed of the N channel MOSFET switch S2.

The relationship between the scale voltage −V1 and the resistors 33 and 35 is determined by the Equation 3 below:

$$-V1 = [R33/(R33+R35)][-V] \qquad 3:$$

The relationship between the speed of the N channel MOSFET switch S2 and the resistors 33 and 35 is determined by Equation 4 below:

$$\text{Speed of } S2 = \frac{1}{[(R33 * R35)/(R33+R35)][\text{Capacitance of the } N \text{ Channel } MOSFET]} \qquad 4:$$

Thus, as can bee seen from Equations 3 and 4, by adjusting the resistance of resistors 33 and 35, the drive voltage −V1 and speed of the N Channel MOSFET switch S2 can similarly be controlled.

The excitation circuit 3 also contains zener diodes 30 and 34. These diodes are respectively provided to protect the gate to source voltages of the switches S1 and S2.

A capacitor 37 and resistor 39 are also provided in the excitation circuit 3. It is important to note that the capacitor 3 7 controls the time during which both transistors 25 and 27 remain off. This is attributable to the fact that the size of the capacitor 37 can be varied to slow down the time during which the drive signal 11 shown in FIG. 9(b) changes from either +1V to −1V or vice versa.

Thus, the delay for turning the MOSFET switches S1 and S2 on and off can be indirectly controlled by varying the size of the capacitor 37. In particular, the larger the size of the capacitor 37, the larger the delay.

It should also be noted that the time during which the transistors 25 and 27 remain off can be controlled by changing the values of resistors 19 and 39. That is, the larger the values of resistors 19 and 39, the slower the speed of the transistors 25 and 27. The relationship between the speed of the transistors 25 and 27 and the resistors 19 and 39 is determined by Equation 5 below:

$$\text{Speed of Transistor} = \frac{1}{[(R19*R37)/(R19+R37)]} \quad 5:$$

The excitation circuit 3 also includes a capacitor 40 which is connected to the winding L1. The capacitor 40 is provided to absorb any residual current which is present in the winding L1.

It is important to note that the interaction between the capacitor 40 with the winding L1 creates an unwanted additional phase shift between the Phase I and Phase II voltage. As such, to compensate for this additional phase shift, the relative phase between the drive signal 11 provided to the excitation circuit 3 and the drive signal 12 provided to the excitation circuit 5 is adjusted. The amount of the adjustment is a function of the value of the capacitance 40 and the inductance of the windings L1 and L2.

Figure 10:
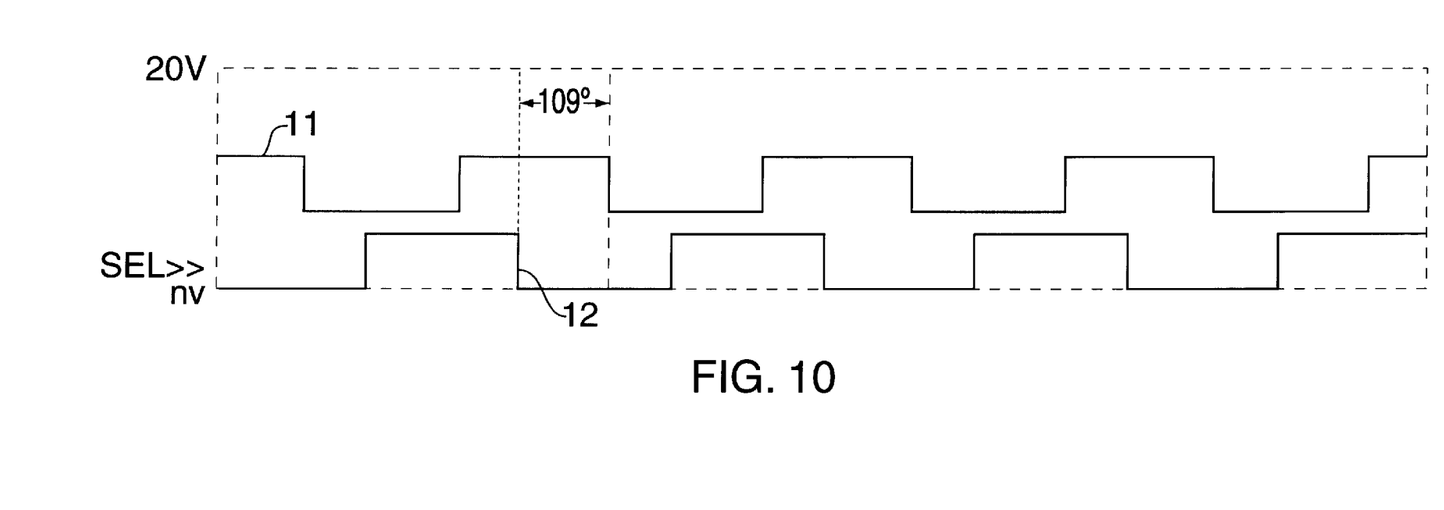

FIG. 10 shows a relationship between the drive signal 11 shown in FIGS. 9, which is used to drive switches S1 and S2 of the excitation circuit 3, and a drive signal 12 which is used to drive switches S3 and S4 of the excitation circuit 5. As is indicated on the drawing, the drive signal 11 is out 5 of phase from the drive signal 12. In the present invention, the drive signal 11 was adjusted to be 109° out of phase from the drive signal 12. This relative phase adjustment between the drive signals 1I1 and 12 further contributes to eliminating the imbalance between the Phase I and Phase II voltage.

The drive signal 11 can be of any value but typically falls within a range of 0 to 20 volts. It is also important to note that the value of the drive signal 11 can be varied to further adjust the delays of the excitation circuit 3 to balance the phase voltages.

Based on the foregoing, it can be seen that the excitation circuit 3 balances the phase voltages in a two phase motor by providing circuitry to slow Is the speed and adjust the timing of switches S1 and S2 during the transition when switches S1 and S2 are opening. As a result, the residual current of the winding L1 flows in and out of the capacitor 40 and does not flow into the positive voltage supply +V.

The present invention is not to be considered limited in scope by the preferred embodiments described in the specification. In particular, the function of the capacitor 17 and the resistor 19 can be implemented by a microprocessor or other programmable logic device. Additional advantages and modifications, which will readily occur to those skilled in the art from consideration of the specification and practice of the invention, are intended to be within the scope and spirit of the following claims.

We claim:

1. An excitation circuit for balancing the phase voltages in a two phase motor, said circuit comprising:

a first and second switch;

means for generating a signal to drive said first and second switches; and, means for adjusting the speed and timing of said first and second switches to balance the phase voltages.

2. The excitation circuit according to claim 1, where said first switch is a P channel MOSFET and said second switch is an N channel MOSFET.

3. The excitation circuit according to claim 2, where in said adjusting means includes:

a first transistor for controlling a first voltage which drives said first switch;

a second transistor for controlling a second voltage which drives said second switch;

a first and second resistor for scaling said first voltage and controlling a speed of said first switch; and a third and fourth resistor for scaling said second voltage and controlling a speed of said second switch.

4. The excitation circuit according to claim 3 further comprising:

a capacitor which controls the time during which said first and second transistors remain on and off; and, a fifth and sixth resistor for controlling the speed of said first and second transistors.

5. A method for balancing the phase voltages in a two phase motor, said method comprising:

(i) receiving a drive signal for operating a first and second switch;

(ii) removing a DC component from said drive signal to create a positive voltage portion and a negative voltage portion;

(iii) applying the positive voltage portion of the drive signal to a first transistor to produce a first voltage for driving said first switch;

(iv) applying the negative voltage portion of the drive signal to a second transistor to produce a second voltage for driving said second switch; and, (v) adjusting the speed of said first and second switches and said first and second transistors to balance the phase voltage.

6. A two phase motor comprising:

A first motor winding;

a first excitation circuit which is connected to said first motor winding for creating a first phase voltage, said first excitation circuit containing a first and second switch;

a second motor winding;

a second excitation circuit which is connected to said second motor winding for creating a second phase voltage, said second excitation circuit containing a third and fourth switch;

means for producing a first drive signal to control the positioning of said first and second switch; and, means for producing a second drive signal to control the positioning of said third and fourth switch, said second drive signal having a relative phase, as compared to said first drive signal, which is adjusted to eliminate an imbalance in at least one of said first and second phase voltages.

7. A two phase motor according to claim 6 wherein said first excitation circuits includes:

a port for receiving said first drive signal; and means for adjusting the speed and timing of said first and second switches to balance the phase voltages.

8. The excitation circuit according to claim 7, where said first switch is a P channel MOSFET and said second switch is an N channel MOSFET.

9. The excitation circuit according to claim 8, where in said adjusting means includes:
- a first transistor for controlling a first voltage which drives said first switch;
- a second transistor for controlling a second voltage which drives said second switch;
- a first and second resistor for scaling said first drive voltage and controlling a speed of said first switch; and
- a third and fourth resistor for scaling said second drive voltage and controlling a speed of said second switch.

10. The excitation circuit according to claim 9 further comprising:
- a capacitor which controls the time during which said first and second transistors remain on and off; and,
- a fifth and sixth resistor for controlling the speed of said first and second transistors.

11. An excitation circuit for balancing the phase voltages in a two phase motor having a first and second winding, said circuit comprising:
- a first and second switch which are respectively connected to said first and second winding;
- a means for generating a signal to drive said first and second switches; and,
- means for adjusting the speed and timing of said first and second switches to balance the phase voltages.

12. The excitation circuit according to claim 11, where said first switch is a P channel MOSFET and said second switch is an N channel MOSFET.

13. The excitation circuit according to claim 12, where in said adjusting means includes:
- a first transistor for controlling a first voltage which drives said first switch;
- a second transistor for controlling a second voltage which drives said second switch;
- a first and second resistor for scaling said first voltage and controlling a speed of said first switch; and
- a third and fourth resistor for scaling said second voltage and controlling a speed of said second switch.

14. The excitation circuit according to claim 13 further comprising:
- a capacitor which controls the time during which said first and second transistors remain on and off; and,
- a fifth and sixth resistor for controlling the speed of said first and second transistors.

* * * * *